US012413813B2

(12) United States Patent
Vars et al.

(10) Patent No.: US 12,413,813 B2
(45) Date of Patent: Sep. 9, 2025

(54) SYSTEMS AND METHODS FOR REAL-TIME GENERATION OF LIVE EVENT AUDIENCE ANALYTICS

(71) Applicant: Mixhalo Corp., San Francisco, CA (US)

(72) Inventors: John Denton Vars, San Francisco, CA (US); Vikram Singh, San Francisco, CA (US)

(73) Assignee: Mixhalo Corp., San Francisco, CA (US)

( * ) Notice: Subject to any disclaimer, the term of this patent is extended or adjusted under 35 U.S.C. 154(b) by 0 days.

(21) Appl. No.: 18/654,205

(22) Filed: May 3, 2024

(65) Prior Publication Data
US 2024/0373091 A1 Nov. 7, 2024

Related U.S. Application Data

(60) Provisional application No. 63/463,595, filed on May 3, 2023.

(51) Int. Cl.
*H04N 21/442* (2011.01)
(52) U.S. Cl.
CPC .............. *H04N 21/44218* (2013.01)
(58) Field of Classification Search
None
See application file for complete search history.

(56) References Cited

U.S. PATENT DOCUMENTS

| 11,461,070 | B2 | 10/2022 | Einziger et al. | |
|---|---|---|---|---|
| 11,625,213 | B2 | 4/2023 | Einziger et al. | |
| 2015/0058129 | A1* | 2/2015 | Nevid | G06Q 30/0269 705/14.64 |
| 2016/0027209 | A1* | 1/2016 | Demirli | G06T 19/003 345/419 |

(Continued)

OTHER PUBLICATIONS

A. Alruban et al., Physical Activity Recognition by Utilising Smartphone Sensor Signals, Jan. 20, 2022, 10 pages, arxiv.org/pdf/2201.08688.

(Continued)

*Primary Examiner* — Alexander Q Huerta
(74) *Attorney, Agent, or Firm* — Cesari and McKenna, LLP

(57) ABSTRACT

A method for real-time generation of live event audience behavioral data includes receiving a data representation of a live audio signal corresponding to the live event via a wireless network and processing the data representation of the live audio signal into a live audio stream. The method also includes calculating a first location of a mobile computing device with respect to a reference point based on first location data. The method also includes generating sensor data based on one or more sensors of the mobile computing device. The method also includes calculating a second location of the mobile computing device with respect to the first location based on second location data. The method also includes determining an audience member behavior based on the sensor data and the second location, and determining a corresponding event based on the live audio stream and a time stamp associated with the audience member behavior.

20 Claims, 4 Drawing Sheets

(56) References Cited

U.S. PATENT DOCUMENTS

| | | | | |
|---|---|---|---|---|
| 2016/0173927 A1* | 6/2016 | de Sa | ................... | H04N 5/765 386/223 |
| 2016/0192156 A1* | 6/2016 | Freeman | ............ | G06Q 30/0201 455/456.1 |
| 2016/0360377 A1* | 12/2016 | Lovich | ................. | H04W 4/022 |
| 2017/0124578 A1* | 5/2017 | Bennett | .............. | G06Q 20/3224 |
| 2018/0096367 A1* | 4/2018 | Zamer | ................ | G06Q 30/0255 |
| 2019/0304216 A1* | 10/2019 | Mendelson | ............ | G06F 1/163 |
| 2020/0320592 A1* | 10/2020 | Soule | ................... | H04W 4/021 |
| 2020/0351321 A1* | 11/2020 | Lueth | ................... | H04L 65/764 |
| 2022/0030214 A1* | 1/2022 | Sinharoy | .............. | H04N 13/194 |
| 2023/0020399 A1 | 1/2023 | Singh et al. | | |
| 2024/0021218 A1 | 1/2024 | Singh et al. | | |
| 2024/0022769 A1* | 1/2024 | Singh | .............. | H04N 21/43072 |
| 2024/0276075 A1* | 8/2024 | Miller | ............... | H04N 21/8358 |

OTHER PUBLICATIONS

J. Rabbi et al., Human Activity Analysis and Recognition from Smartphones using Machine Learning Techniques, Mar. 30, 2021, arXiv:2103.16490.

* cited by examiner

SYSTEMS AND METHODS FOR REAL-TIME GENERATION OF LIVE EVENT AUDIENCE ANALYTICS

RELATED APPLICATION(S)

This application claims priority to U.S. Provisional Patent Application No. 63/463,595, filed on May 3, 2023, the entire disclosure of which is incorporated herein by reference.

FIELD OF THE INVENTION

This invention relates generally to the field of real-time generation and delivery of data over wireless networks. More specifically, the invention relates to systems and methods for generating and delivering live event audience behavioral data in real-time.

BACKGROUND

Audience members at live events often move around a venue during the event. For example, an audience member may choose to use a bathroom at the venue, make a purchase at a concession stand, or leave the venue altogether. Audience members may also change their stationary behavior during the event (e.g., sitting, standing, dancing, or cheering). Mobile computing devices such as mobile phones or smart watches often have sensors that can help track some of these movements and behaviors. However, current solutions do not have the ability to time-align that sensory data to a live event sequence and generate insights based on that sensory data for the event producer. Therefore, there is a need for systems and methods that can accurately collect time-aligned sensory data from audience members at live events.

SUMMARY

The present invention includes systems and methods for real-time generation of live event audience behavioral data based on data generated and collected by a mobile computing device at a live event venue. For example, the present invention includes methods and mechanisms for receiving a data representation of a live audio signal corresponding to a live event via a wireless network and processing the data representation of the live audio signal into a live audio stream using the mobile computing device at the live event.

The present invention also includes methods and mechanisms for calculating a first location of the mobile computing device with respect to a reference point at the live event based on first location data. The present invention also includes methods and mechanisms for generating sensor data based on one or more sensors of the mobile computing device at the live event. The present invention also includes methods and mechanisms for calculating a second location of the mobile computing device with respect to the first location based on second location data.

The present invention also includes methods and mechanisms for determining an audience member behavior based on the generated sensor data and the calculated second location. The present invention also includes methods and mechanisms for determining a corresponding event based on the live audio stream and a time stamp associated with the audience member behavior.

In one aspect, the invention includes a computerized method for real-time generation of live event audience behavioral data using a mobile computing device at a live event. The computerized method includes receiving a data representation of a live audio signal corresponding to the live event via a wireless network. The computerized method also includes processing the data representation of the live audio signal into a live audio stream. The computerized method also includes calculating a first location of the mobile computing device with respect to a reference point at the live event based on first location data.

The computerized method also includes generating sensor data based on one or more sensors of the mobile computing device at the live event. The computerized method also includes calculating a second location of the mobile computing device with respect to the first location based on second location data. The computerized method also includes determining an audience member behavior based on the generated sensor data and the calculated second location. The computerized method also includes determining a corresponding event based on the live audio stream and a time stamp associated with the audience member behavior.

In some embodiments, the computerized method further includes receiving the data representation of the live audio signal corresponding to the live event from an audio server computing device via the wireless network.

In some embodiments, the computerized method further includes determining the first location data based on first audio captured by a microphone of the mobile computing device and determining the second location data based on second audio captured by the microphone of the mobile computing device. For example, in some embodiments, the first location data includes a first distance from the reference point at the live event and the second location includes a second distance from the first location.

In some embodiments, the computerized method further includes receiving at least one of the first location data or the second location data from a second mobile computing device at the live event. In other embodiments, the computerized method further includes receiving at least one of the first location data or the second location data from an access point at the live event.

In some embodiments, the one or more sensors of the mobile computing device at the live event include at least one of a camera, an accelerometer, an ambient light sensor, an ambient temperature sensor, an air humidity sensor, a barometer sensor, a fingerprint sensor, a gyroscope sensor, a magnetometer, a near-field communication sensor, a Bluetooth sensor, a proximity sensor, or a pedometer sensor.

In some embodiments, the audience member behavior includes at least one of sitting, standing, dancing, cheering, using a bathroom at a venue associated with the live event, making a purchase at a concession stand of the venue, making a purchase at a merchandise stand of the venue, or leaving the venue. In some embodiments, the corresponding event includes a musical track performed at the live event. In other embodiments, the corresponding event includes a sport-related event performed at the live event.

In another aspect, the invention includes a system for real-time generation of live event audience behavioral data. The system includes a mobile computing device communicatively coupled to an audio server computing device over a wireless network. The mobile computing device is configured to receive a data representation of a live audio signal corresponding to the live event via the wireless network. The mobile computing device is also configured to process the data representation of the live audio signal into a live audio stream. The mobile computing device is also configured to calculate a first location of the mobile computing device with respect to a reference point at the live event based on first location data.

The mobile computing device is also configured to generate sensor data based on one or more sensors of the mobile computing device at the live event. The mobile computing device is also configured to calculate a second location of the mobile computing device with respect to the first location based on second location data. The mobile computing device is also configured to determine an audience member behavior based on the generated sensor data and the calculated second location. The mobile computing device is also configured to determine a corresponding event based on the live audio stream and a time stamp associated with the audience member behavior.

In some embodiments, the mobile computing device at the live event is further configured to receive the data representation of the live audio signal corresponding to the live event from the audio server computing device via the wireless network.

In some embodiments, the mobile computing device at the live event is further configured to determine the first location data based on first audio captured by a microphone of the mobile computing device and determine the second location data based on second audio captured by the microphone of the mobile computing device. For example, in some embodiments, the first location data comprises a first distance from the reference point at the live event and the second location data comprises a second distance from the first location.

In some embodiments, the mobile computing device at the live event is further configured to receive at least one of the first location data or the second location data from a second mobile computing device at the live event. In other embodiments, the mobile computing device at the live event is further configured to receive at least one of the first location data or the second location data from an access point at the live event.

In some embodiments, the one or more sensors of the mobile computing device at the live event include at least one of an accelerometer, an ambient light sensor, an ambient temperature sensor, an air humidity sensor, a barometer sensor, a fingerprint sensor, a gyroscope sensor, a magnetometer, a near-field communication sensor, a proximity sensor, or a pedometer sensor.

In some embodiments, the audience member behavior includes at least one of sitting, standing, dancing, cheering, using a bathroom at a venue associated with the live event, making a purchase at a concession stand of the venue, or leaving the venue. In some embodiments, the corresponding event includes a musical track performed at the live event. In other embodiments, the corresponding event includes a sport-related event performed at the live event.

These and other aspects of the invention will be more readily understood from the following descriptions of the invention, when taken in conjunction with the accompanying drawings and claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
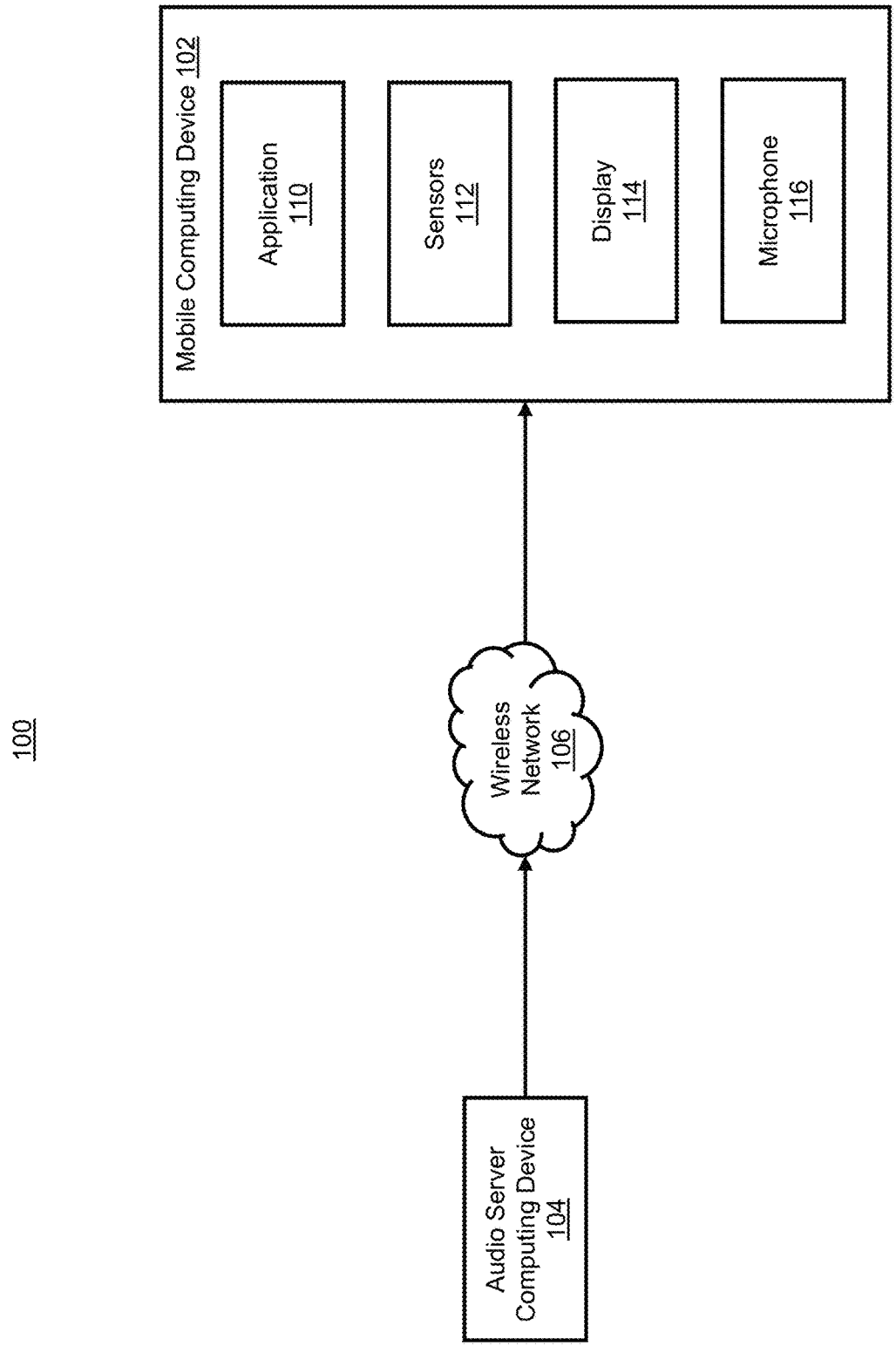
FIG. 1 is a schematic diagram of a system architecture for real-time generation of live event audience behavioral data using a mobile computing device at a live event, according to an illustrative embodiment of the invention.

FIG. 1 is a schematic diagram of a system architecture 100 for real-time generation of live event audience behavioral data using a mobile computing device at a live event, according to an illustrative embodiment of the invention. System 100 includes a mobile computing device 102 communicatively coupled to an audio server computing device 104 over a wireless network 106. Mobile computing device 102 includes an application 110, one or more sensors 112, a display 114, and a microphone 116. In some embodiments, the audio server computing device 104 is communicatively coupled to an audio interface (not shown).

Exemplary mobile computing devices 102 include, but are not limited to, tablets and smartphones, such as Apple® iPhone®, iPad® and other iOS®-based devices, and Samsung® Galaxy®, Galaxy Tab™ and other Android™-based devices. It should be appreciated that other types of computing devices capable of connecting to and/or interacting with the components of system 100 can be used without departing from the scope of invention. Although FIG. 1 depicts a single mobile computing device 102, it should be appreciated that system 100 can include a plurality of mobile computing devices.

Mobile computing device 102 is configured to receive a data representation of a live audio signal corresponding to the live event via wireless network 106. For example, in some embodiments, mobile computing device 102 is configured to receive the data representation of the live audio signal corresponding to the live event from audio server computing device 104 via wireless network 106, where audio server computing device 104 is coupled to an audio source at the live event (e.g., a soundboard that is capturing live audio). Mobile computing device 102 is also configured to process the data representation of the live audio signal into a live audio stream.

Figure 3:
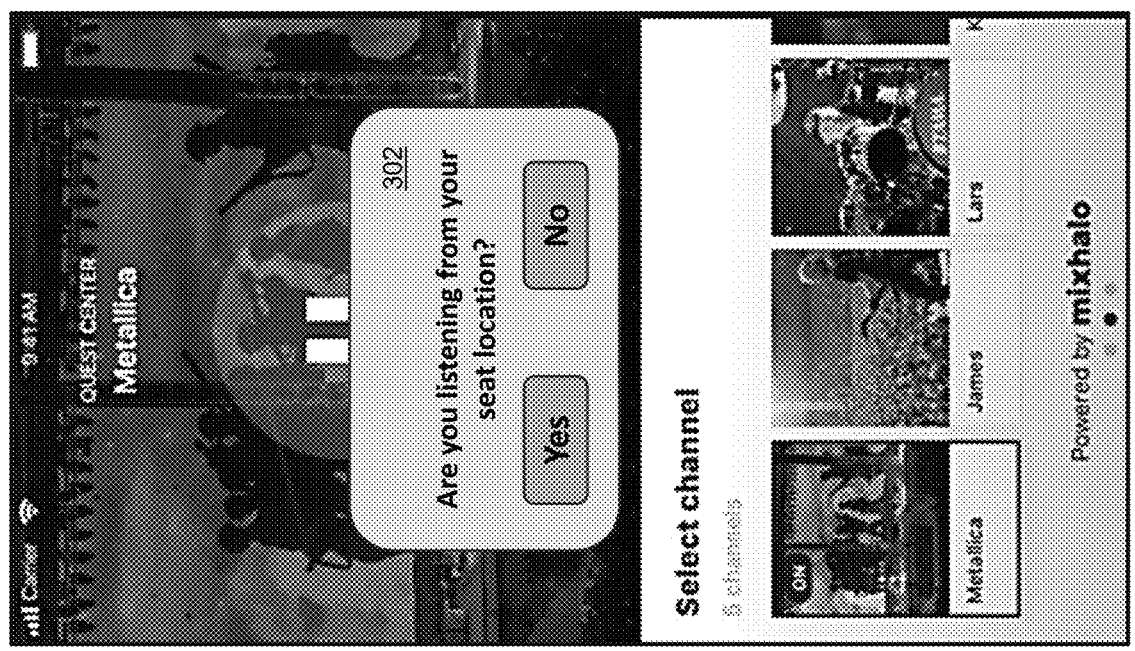
FIG. 3 is a diagram of an exemplary user interface for identifying a first mobile device location at a live event.

Mobile computing device 102 is also configured to calculate a first location of the mobile computing device 102 with respect to a reference point at the live event based on first location data. In some embodiments, the reference point can relate to a particular aspect of the live event. As just one example, at a concert, the reference point can be the main performance stage. In some embodiments, mobile computing device 102 can determine the first location based upon a distance from the reference point that is calculated using latency estimation techniques. For example, mobile computing device 102 can capture audio of the live event using microphone 116 while also receiving the data representation of the live audio signal via wireless network 106. Mobile device 102 can determine a delay between the captured audio from microphone 116 and the received live audio from wireless network 106 to estimate the distance of mobile device 102 from the reference point. Further detail of determining distance using latency estimation is described in U.S. Patent Application Publication No. 2023/0020399 to Singh et al., titled "Dynamic Latency Estimation for Audio Streams," published Jan. 19, 2023, which is incorporated herein by reference. In some embodiments, the calculated first location can be stored by mobile computing device 102 as the seat location of the user. For example, upon determining the distance from the reference point, mobile computing device 102 can identify that the distance is within a determined threshold from the reference point. In the example of a concert, mobile device 102 can identify that the distance is within 100 yards from the stage-indicating that the user is likely at their seat location. In some embodiments, mobile computing device 102 can display an on-screen prompt to the user, asking them to confirm whether they are at their seat location. FIG. 3 is a diagram of an exemplary user interface 300 of mobile computing device 102 that can be displayed to the user upon determining the first location. As shown in FIG. 3, user interface 300 includes prompt 302 asking the user to confirm whether they are listening from their seat location. Upon receiving confirmation from the user, mobile device 102 can store the determined first location as the seat location. In some embodiments, it is not necessary for mobile computing device 102 to prompt the user to confirm the location; instead, mobile computing device 102 can use other information stored on the device (such as a digital event ticket or a photograph of a physical ticket) to determine the user's probable or actual location.

Mobile computing device 102 is also configured to calculate a second location of the mobile computing device 102 with respect to the first location based on second location data. As described above, in some embodiments, mobile computing device 102 is configured to determine the first location data based on first audio of the live event captured by microphone 116 of the mobile computing device 102. Mobile computing device 102 can further determine the second location data based on second audio of the live event captured by microphone 116 of the mobile computing device 102. As mentioned above, in some embodiments, the first location data comprises a first distance from the reference point at the live event venue that is estimated by mobile device 102 using dynamic latency estimation. Mobile computing device 102 can periodically or continuously estimate the distance of mobile device 102 from the reference point using dynamic latency estimation, such that when mobile computing device 102 determines from the latency estimation that mobile device 102 has moved to a different location, the device can calculate the second location data (e.g., a second distance of the mobile computing device from the reference point). Using the second location data, mobile device 102 can determine a distance between the first location and the second location.

In some embodiments, mobile computing device 102 is configured to receive at least one of the first location data or the second location data from a second mobile computing device 102 at the live event. In other embodiments, mobile computing device 102 is further configured to receive at least one of the first location data or the second location data from an access point (not shown) at the live event. In some embodiments, the access point is communicatively coupled to the audio server computing device 104 via wireless network 106.

Mobile computing device 102 is also configured to generate sensor data based on one or more sensors 112 of the mobile computing device 102. For example, in some embodiments, the one or more sensors 112 of the mobile computing device 102 include at least one of a camera, an accelerometer, an ambient light sensor, an ambient temperature sensor, an air humidity sensor, a barometer sensor, a fingerprint sensor, a gyroscope sensor, a magnetometer, a near-field communication (NFC) sensor, a Bluetooth® communication sensor, a proximity sensor, or a pedometer sensor.

Figure 4:
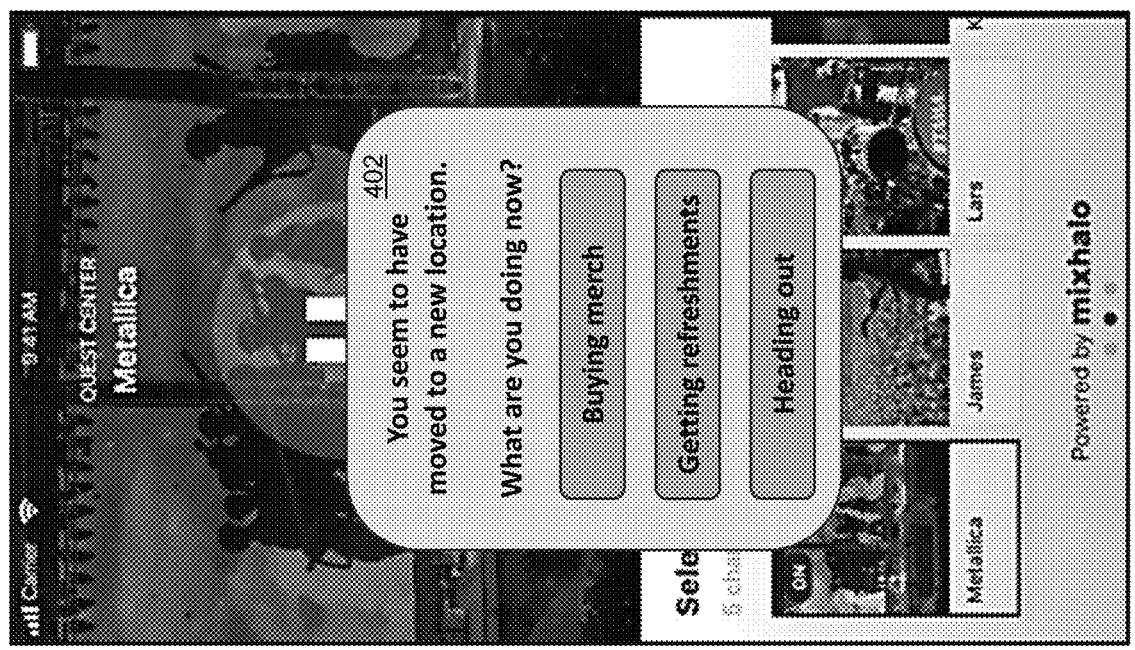
FIG. 4 is a diagram of an exemplary user interface for identifying a second mobile device location at a live event.

Mobile computing device 102 is also configured to determine an audience member behavior based on the generated sensor data and the calculated second location. For example, in some embodiments, the audience member behavior includes at least one of sitting, standing, dancing, cheering, using a bathroom at a venue associated with the live event, making a purchase at a concession stand of the venue, or leaving the venue. In some embodiments, mobile computing device 102 analyzes the data received from one or more sensors 112 to determine a potential or probable motion/movement of the audience member. Exemplary techniques for determining motion or movement based upon mobile device sensor data are described in (i) A. Alruban et al., "Physical Activity Recognition by Utilising Smartphone Sensor Signals," arXiv: 2201.08688 [cs.HC], Jan. 20, 2022, available at arxiv.org/pdf/2201.08688.pdf; and (ii) J. Rabbi et al., "Human Activity Analysis and Recognition from Smartphones using Machine Learning Techniques," arXiv: 2103.16490 [cs.LG], Mar. 30, 2021, available at arxiv.org/pdf/2103.16490.pdf; each of which is incorporated by reference herein). Then, combining the motion/movement with the calculated second location, mobile computing device 102 can identify an audience member behavior. For example, when mobile device 102 determines from the sensor data that the device is moving in a particular pattern (e.g., up/down/side to side) and mobile device 102 determines from the calculated second location that the device is located at or close to the first location (i.e., at the audience member's seat location), mobile device 102 can determine that the audience member is dancing or cheering. In another example, when mobile device 102 determines from the sensor data that the device is moving and mobile device determines from the location data that the device is in a separate area from the first location (e.g., another part of the venue), mobile device can determine that the audience member is leaving the venue. FIG. 4 is a diagram of an exemplary user interface 400 of mobile computing device 102 that can be displayed to the audience member upon determining the second location. As shown in FIG. 4, user interface 400 includes prompt 402 asking the user to confirm if they are doing something other than listening/participating in the live event. In some embodiments, mobile computing device 102 records timestamp data in association with the determined audience behavior data, to capture a time-based sequence of user behavior during a particular live event.

However, it should be appreciated that in some embodiments, the location and behavior detection can be performed by mobile computing device 102 without requiring any user interaction or awareness. In these embodiments, mobile computing device 102 can automatically analyze, e.g., changes in location, activation of certain apps and/or hardware of mobile device 102, and/or other data elements to perform the processing described herein. For example, when the user activates a mobile payment app such as Apple® Wallet™ and/or uses a near-field communication (NFC) chip in mobile device 102 to complete a payment, the mobile device can determine that the user is paying for something (such as concessions, merchandise, etc.) at the venue. In another example, mobile device 102 can use other location data (e.g., GPS coordinates) captured by the device to determine that the user is moving away from the main stage area toward another part of the venue.

Mobile computing device 102 is also configured to determine a corresponding event based on the live audio stream and a timestamp associated with the audience member behavior. For example, in some embodiments, the corresponding event includes a musical track performed at the live event. In other embodiments, the corresponding event includes a sport-related event performed at the live event. Mobile computing device 102 can analyze the live audio stream to determine one or more events occurring at the live event. In the example of a sporting event, mobile computing device 102 can analyze, e.g., speech of an announcer in the live audio to determine a particular play or action occurring in the sporting event. Mobile computing device 102 can utilize timestamp data contained in the live audio stream to determine that the event took place at a specific time (or during a defined period of time). Mobile device 102 can correlate the event data with the audience member behavior data (e.g., location, movement) and/or mobile device sensor data using the timestamps. As an example, an audience member may be taking photos and/or videos at a particular point in the event. Mobile computing device 02 can associate timestamps of the captured media with the corresponding event.

In some embodiments, correlating the events with audience member behavior and/or live audio stream can provide insights into, e.g., level of audience engagement, interest, and/or participation in the live event at particular points. For example, an audience member may be able to choose between several different live audio streams at a particular live event. Mobile computing device 102 can incorporate the choice of live audio stream into the event and behavior analysis described above. For example, at a sporting event, a first live audio stream may have a high-energy, partisan announcer calling the game (e.g., a home team's broadcast) while a second live audio stream may have a more reserved, neutral announcer also calling the game (e.g., a national channel broadcast). Mobile computing device 102 can associate the behavior with the channel selection to determine, e.g., that audience members who are listening to the first live audio stream with the high-energy announcer are exhibiting a greater amount of passion (e.g., cheering, standing, yelling) at the game versus audience members who are listening to the second live audio stream with the reserved announcer.

Audio server 104 is a computing device comprising specialized hardware and/or software modules that execute on one or more processors and interact with memory modules of the audio server computing device, to receive data from other components of the system 100, transmit data to other components of the system 100, and perform functions relating to wireless capture of real-time audio and video at a live event using a mobile computing device as described herein. In some embodiments, audio server computing device 104 is configured to receive a live audio signal from an audio source at the live event (e.g., a soundboard that is capturing the live audio) and transmit a data representation of the live audio signal via network 106 to one or more mobile computing devices 102.

In some embodiments, audio server computing device 104 can pre-process the live audio signal when generating the data representation of the live audio signal prior to transmission to mobile computing devices. For example, the audio server computing device 104 can generate one or more data packets corresponding to the live audio signal. In some embodiments, creating a data representation of the live audio signal includes using one of the following compression codecs: AAC, HE-AAC MP3, MPE VBR, Apple Lossless, IMA4, IMA ADPCM, or Opus.

Wireless network 106 is configured to communicate electronically with network hardware of the audio server computing device 104 and to transmit the data representation of the live audio signal to the mobile computing device 102. In some embodiments, the network 104 can support one or more routing schemes, e.g., unicast, multicast and/or broadcast.

Additional detail regarding illustrative technical features of the methods and systems described herein are found in U.S. Pat. No. 11,461,070, titled "Systems and Methods for Providing Real-Time Audio and Data" and issued Oct. 24, 2022; U.S. Pat. No. 11,625,213, titled "Systems and Methods for Providing Real-Time Audio and Data," and issued Apr. 11, 2023; U.S. patent application Ser. No. 18/219,778, titled "Systems and Methods for Wireless Real-Time Audio and Video Capture at a Live Event," published as U.S. Patent Application Publication No. 2024/0022769 on Jan. 18, 2024; and U.S. patent application Ser. No. 18/219,792, titled "Systems and Methods for Wireless Real-Time Audio and Video Capture at a Live Event," published as U.S. Patent Application Publication No. 2024/0021218 on Jan. 18, 2024; the entirety of each of which is incorporated herein by reference.

Figure 2:
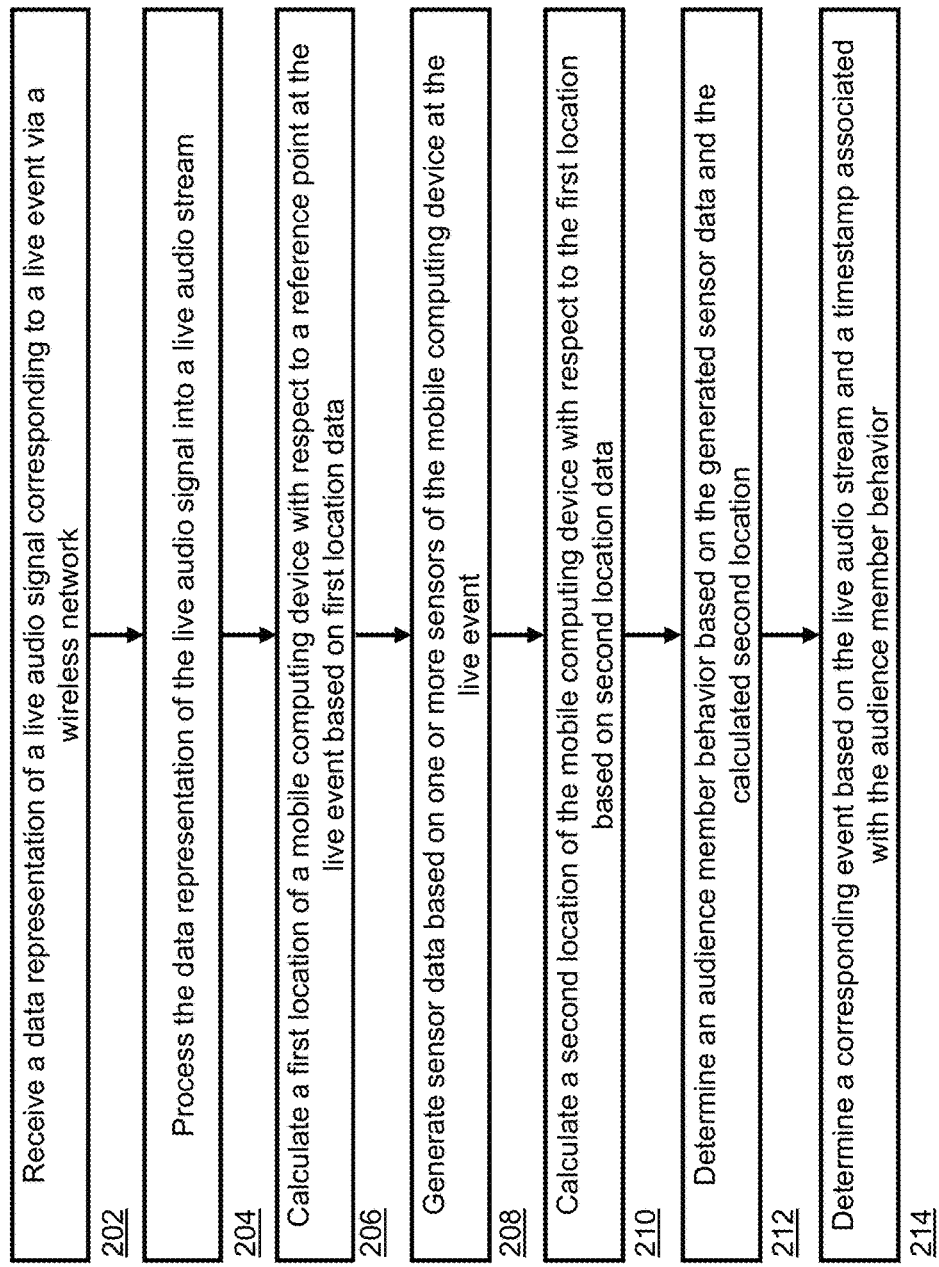
FIG. 2 is a schematic flow diagram illustrating method steps for real-time generation of live event audience behavioral data using a mobile computing device at a live event using the system architecture of FIG. 1, according to an illustrative embodiment of the invention.

FIG. 2 is a schematic flow diagram illustrating a process 200 for real-time generation of live event audience behavioral data using a mobile computing device 102 at a live event using system architecture 100, according to an illustrative embodiment of the invention. Process 200 begins by receiving a data representation of a live audio signal corresponding to the live event via a wireless network 106 at step 202. For example, in some embodiments, process 200 further includes receiving the data representation of the live audio signal corresponding to the live event from an audio server computing device 104 via the wireless network 106. Process 200 continues by processing the data representation of the live audio signal into a live audio stream at step 204.

Process 200 continues by calculating a first location of the mobile computing device 102 with respect to a reference point at the live event based on first location data at step 206. Process 200 continues by generating sensor data based on one or more sensors 112 of the mobile computing device 102 at the live event at step 208. For example, in some embodiments, the one or more sensors 112 of the mobile computing device 102 at the live event include at least one of a camera, an accelerometer, an ambient light sensor, an ambient temperature sensor, an air humidity sensor, a barometer sensor, a fingerprint sensor, a gyroscope sensor, a magnetometer, a near-field communication sensor, a Bluetooth® communication sensor, a proximity sensor, or a pedometer sensor.

Process 200 continues by calculating a second location of the mobile computing device 102 with respect to the first location based on second location data at step 210. For example, in some embodiments, process 200 further includes determining the first location data based on first audio captured by a microphone 116 of the mobile computing device 102 and determining the second location data based on second audio captured by the microphone 116 of the mobile computing device 102. In some embodiments, the first location data includes a first distance from the reference point at the live event and the second location includes a second distance from the first location.

In some embodiments, process 200 further includes receiving at least one of the first location data or the second location data from a second mobile computing device 102 at the live event. In other embodiments, process 200 further includes receiving at least one of the first location data or the second location data from an access point at the live event.

Process 200 continues by determining an audience member behavior based on the generated sensor data and the calculated second location at step 212. For example, in some embodiments, the audience member behavior includes at least one of sitting, standing, dancing, cheering, using a bathroom at a venue associated with the live event, making a purchase at a concession stand of the venue, or leaving the venue.

Process 200 finishes by determining a corresponding event based on the live audio stream and a time stamp associated with the audience member behavior at step 214. For example, in some embodiments, the corresponding event includes a musical track performed at the live event. In other embodiments, the corresponding event includes a sport-related event performed at the live event.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™ Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific preferred embodiments, it should be understood by those skilled in the art that various changes in form and detail may be made therein without departing from the spirit and scope of the invention as defined by the following claims. One skilled in the art will realize the subject matter may be embodied in other specific forms without departing from the spirit or essential characteristics thereof. The foregoing embodiments are therefore to be considered in all respects illustrative rather than limiting the subject matter described herein.

What is claimed is:

1. A computerized method for real-time generation of live event audience behavioral data, the method comprising:
   receiving, by a mobile computing device at a live event, a data representation of a live audio signal corresponding to the live event via a wireless network;
   processing, by the mobile computing device at the live event, the data representation of the live audio signal into a live audio stream;
   calculating, by the mobile computing device at the live event, a first location of the mobile computing device with respect to a reference point at the live event based on first location data;
   generating, by the mobile computing device at the live event, sensor data based on one or more sensors of the mobile computing device at the live event;
   calculating, by the mobile computing device at the live event, a second location of the mobile computing device with respect to the first location based on second location data;
   determining, by the mobile computing device at the live event, an audience member behavior based on the generated sensor data and the calculated second location; and
   determining, by the mobile computing device at the live event, a corresponding event based on the live audio stream and a time stamp associated with the audience member behavior.

2. The computerized method of claim 1, wherein the mobile computing device at the live event is configured to receive the data representation of the live audio signal corresponding to the live event from an audio server computing device via the wireless network.

3. The computerized method of claim 1, wherein the mobile computing device at the live event is configured to:
   determine the first location data based on first audio captured by a microphone of the mobile computing device; and
   determine the second location data based on second audio captured by the microphone of the mobile computing device.

4. The computerized method of claim 3, wherein the first location data comprises a first distance from the reference point at the live event and the second location data comprises a second distance from the first location.

5. The computerized method of claim 1, wherein the mobile computing device at the live event is configured to receive at least one of the first location data or the second location data from a second mobile computing device at the live event.

6. The computerized method of claim 1, wherein the mobile computing device at the live event is configured to receive at least one of the first location data or the second location data from an access point at the live event.

7. The computerized method of claim 1, where the one or more sensors of the mobile computing device at the live event comprise at least one of:
   a camera;
   an accelerometer;

an ambient light sensor;
an ambient temperature sensor;
an air humidity sensor;
a barometer sensor;
a fingerprint sensor;
a gyroscope sensor;
a magnetometer;
a near-field communication sensor;
a Bluetooth communication sensor;
a proximity sensor; or
a pedometer sensor.

8. The computerized method of claim 1, wherein the audience member behavior comprises at least one of sitting, standing, dancing, cheering, using a bathroom at a venue associated with the live event, making a purchase at a concession stand of the venue, making a purchase at a merchandise stand of the venue, or leaving the venue.

9. The computerized method of claim 1, wherein the corresponding event comprises a musical track performed at the live event.

10. The computerized method of claim 1, wherein the corresponding event comprises a sport-related event performed at the live event.

11. A system for real-time generation of live event audience behavioral data, the system comprising:
a mobile computing device communicatively coupled to an audio server computing device over a wireless network, the mobile computing device configured to:
receive a data representation of a live audio signal corresponding to the live event via the wireless network;
process the data representation of the live audio signal into a live audio stream;
calculate a first location of the mobile computing device with respect to a reference point at the live event based on first location data;
generate sensor data based on one or more sensors of the mobile computing device at the live event;
calculate a second location of the mobile computing device with respect to the first location based on second location data;
determine an audience member behavior based on the generated sensor data and the calculated second location; and
determine a corresponding event based on the live audio stream and a time stamp associated with the audience member behavior.

12. The system of claim 11, wherein the mobile computing device at the live event is configured to receive the data representation of the live audio signal corresponding to the live event from the audio server computing device via the wireless network.

13. The system of claim 11, wherein the mobile computing device at the live event is configured to:
determine the first location data based on first audio captured by a microphone of the mobile computing device; and
determine the second location data based on second audio captured by the microphone of the mobile computing device.

14. The system of claim 13, wherein the first location data comprises a first distance from the reference point at the live event and the second location data comprises a second distance from the first location.

15. The system of claim 11, wherein the mobile computing device at the live event is configured to receive at least one of the first location data or the second location data from a second mobile computing device at the live event.

16. The system of claim 11, wherein the mobile computing device at the live event is configured to receive at least one of the first location data or the second location data from an access point at the live event.

17. The system of claim 11, where the one or more sensors of the mobile computing device at the live event comprise at least one of:
a camera;
an accelerometer;
an ambient light sensor;
an ambient temperature sensor;
an air humidity sensor;
a barometer sensor;
a fingerprint sensor;
a gyroscope sensor;
a magnetometer;
a near-field communication sensor;
a Bluetooth communication sensor;
a proximity sensor; or
a pedometer sensor.

18. The system of claim 11, wherein the audience member behavior comprises at least one of sitting, standing, dancing, cheering, using a bathroom at a venue associated with the live event, making a purchase at a concession stand of the venue, making a purchase at a merchandise stand of the venue, or leaving the venue.

19. The system of claim 11, wherein the corresponding event comprises a musical track performed at the live event.

20. The system of claim 11, wherein the corresponding event comprises a sport-related event performed at the live event.

* * * * *